United States Patent
Roberts

(10) Patent No.: US 10,451,187 B2
(45) Date of Patent: Oct. 22, 2019

(54) HIGH PRESSURE GATE VALVE

(71) Applicant: Valveworks USA, Inc., Bossier City, LA (US)

(72) Inventor: Richard D. Roberts, Bossier City, LA (US)

(73) Assignee: Valveworks USA, Inc., Bossier City, LA (US)

( * ) Notice: Subject to any disclaimer, the term of this patent is extended or adjusted under 35 U.S.C. 154(b) by 0 days.

(21) Appl. No.: 15/048,457

(22) Filed: Feb. 19, 2016

(65) Prior Publication Data

US 2017/0241552 A1    Aug. 24, 2017

(51) Int. Cl.
*F16K 3/02* (2006.01)
*F16K 3/20* (2006.01)

(52) U.S. Cl.
CPC .............. *F16K 3/0281* (2013.01); *F16K 3/20* (2013.01)

(58) Field of Classification Search
CPC . F16K 3/0281; F16K 3/00; F16K 3/02; F16K 3/0227; F16K 3/0236
USPC ....................................................... 251/327
See application file for complete search history.

(56) References Cited

U.S. PATENT DOCUMENTS

| | | | | |
|---|---|---|---|---|
| 2,868,495 A * | 1/1959 | Lucas | ....................... | F16K 3/14 251/327 |
| 3,612,483 A * | 10/1971 | Pool | ....................... | F16K 1/226 251/306 |
| RE29,299 E * | 7/1977 | Estes | ....................... | F16K 3/36 137/246.22 |
| 4,243,204 A * | 1/1981 | Siepmann | ............. | F16K 27/105 251/329 |
| 4,363,465 A | 12/1982 | Morrill | | |
| 4,471,943 A * | 9/1984 | Nelson | ....................... | F16K 3/02 251/327 |
| 5,143,348 A | 9/1992 | Baker et al. | | |
| 5,211,373 A * | 5/1993 | Baker | ....................... | F16K 3/186 251/196 |
| 6,260,822 B1 * | 7/2001 | Puranik | ................ | F16K 3/0236 251/328 |
| 6,279,875 B1 * | 8/2001 | Chatufale | ............... | F16K 3/207 251/171 |
| 6,664,572 B2 * | 12/2003 | Chatufale | ............. | F16K 3/0227 251/309 |
| 7,004,452 B2 * | 2/2006 | Chatufale | ............. | F16K 3/0227 251/171 |
| 2007/0114483 A1 | 5/2007 | Young et al. | | |
| 2012/0085957 A1 * | 4/2012 | Dhawan | ................ | F16K 3/0209 251/326 |

* cited by examiner

*Primary Examiner* — Marina A Tietjen
(74) *Attorney, Agent, or Firm* — Chamberlain Hrdlicka

(57) ABSTRACT

An annular valve seat for a high pressure gate valve. The valve seat is configured to be received in a seat pocket and includes a gate end facing a gate and a body end. The width of the valve seat gradually narrows from the gate end to the body end. The gradually narrowing width of the valve seat improves the seal and reduces debris intrusion between the valve seat and the seat pocket.

18 Claims, 2 Drawing Sheets

HIGH PRESSURE GATE VALVE

BACKGROUND

This section is intended to provide background information to facilitate a better understanding of the various aspects of the described embodiments. Accordingly, it should be understood that these statements are to be read in this light and not as admissions of prior art.

Gate valves for controlling the flow of fluids typically include a slidable gate moveable between two positions. In the first position, a solid portion of the gate blocks the flow through the valve by intersecting the passageway of fluid flow. In the second position, the gate is raised so that it does not intersect the passageway and allows the flow of fluid through the valve.

The gate can be operated by a circular hand wheel or a hydraulic cylinder. The hand wheel or hydraulic cylinder can be coupled to a stem that adjusts the position of the gate. An inner end of the stem is connected with an end of the gate so that the linear movement of the stem into and out of the valve body carries with it the gate to control the flow of fluid through the valve.

The gate is positioned between two valve seats. A valve seat is generally a ring-shaped structure that has an interior passageway that corresponds in shape and size with the flow passageway through the valve. Typically, the valve seat includes a rectangular cross-section that interfaces with the valve body in a seat pocket.

BRIEF DESCRIPTION OF THE DRAWINGS

For a detailed description of the embodiments of the invention, reference will now be made to the accompanying drawings in which.

DETAILED DESCRIPTION

This disclosure provides a high pressure (e.g., at least 2,000 psi rating) gate valve for permitting or preventing the flow of a fluid. Specifically, the disclosure provides a valve seat that includes a tapering cross-section to improve the seal and reduce debris intrusion between the valve seat and a seat pocket within the valve body.

Generally, the valve seats seal the fluid flow passageway of the gate valve when the gate is lowered to intersect the passageway and prevent fluid flow. Typically, the valve seats include a rectangular cross-section that couples to a seat pocket within the valve body. Under high pressures of debris-laden fluids (e.g., shale oil or gas recovered from hydraulic fracturing), debris such as sand can be forced between the rectangular valve seat and the seat pocket, reducing the sealing effectiveness of the valve seat and increasing the difficulties in removing the seat valve for repair, replacement, or cleaning.

The valve seat of the present disclosure instead includes a tapering cross-section that will create a positive seal across the outer diameter of the valve seat and seat pocket while under high pressure. Likewise, the seat pocket can be made to conform to the tapering cross-section of the valve seat. The positive contact produced by the tapering cross-section can prevent debris from entering between the valve seat and seat pocket. That is, a normal force will be exerted along the tapering surface of the valve seat creating a tighter seal between the valve seat and the seat pocket. Also, the tapering cross-section will allow for easier removal of the valve seat since dimensionally, when the valve seat is removed away from the seat pocket, the gap between the valve seat and seat pocket increases, due to the tapered cross-section of the seat pocket, providing for an immediate breakaway, and ultimately deeming the impacted debris a non-factor during removal.

Figure 1A:
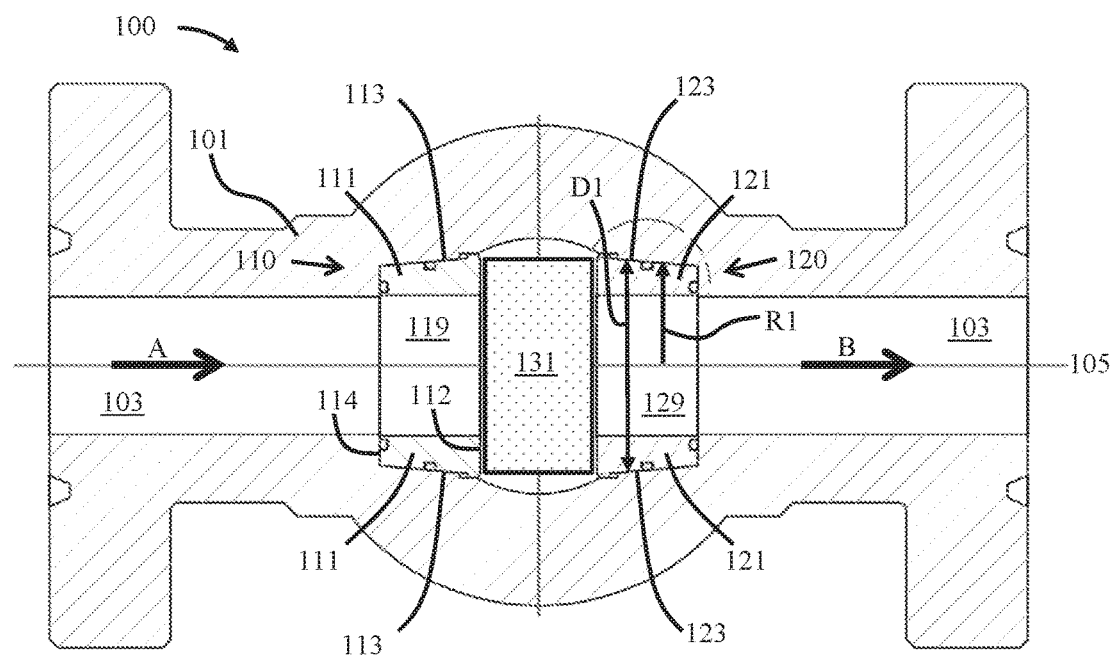
FIG. 1A depicts a cross-sectional view of an example gate valve, according to one or more embodiments.

FIG. 1A depicts a cross-sectional view of an example gate valve 100 in accordance with one or more embodiments. The gate valve 100 includes a valve body 101 having a passageway 103 for fluid flow that passes through a fluid flow axis 105. The arrows A, B along the fluid flow axis 105 indicate the direction of fluid flow within the passageway 103. The gate valve 100 includes a gate 131 that can be moveably positioned to intersect the passageway 103 between the valve seat assemblies 110, 120. A gate actuator (not shown) coupled to the gate 131 can be used to move the gate 131 perpendicular to the plane parallel to the page (i.e., moving in or out of the page). The gate actuator can be configured to moveably position the gate 131 so that it intersects the passageway 103 preventing fluid flow through the passageway 103. The gate actuator can also moveably position the gate 131 so that the passageway 103 is open allowing fluid to flow through the gate 131 and the passageway 103.

The gate valve 100 includes valve seat assemblies 110, 120. The gate valve body 101 includes an upstream seat pocket 113 and a downstream seat pocket 123 that are configured to receive the valve seat assemblies 110, 120, respectively. The valve seat assemblies 110, 120 include an upstream seat 111 and a downstream seat 121. The upstream seat 111 and the downstream seat 121 include passageways 119, 129 (respectively) that can have the same diameter as the passageway 103 of the valve body 101.

Figure 1B:
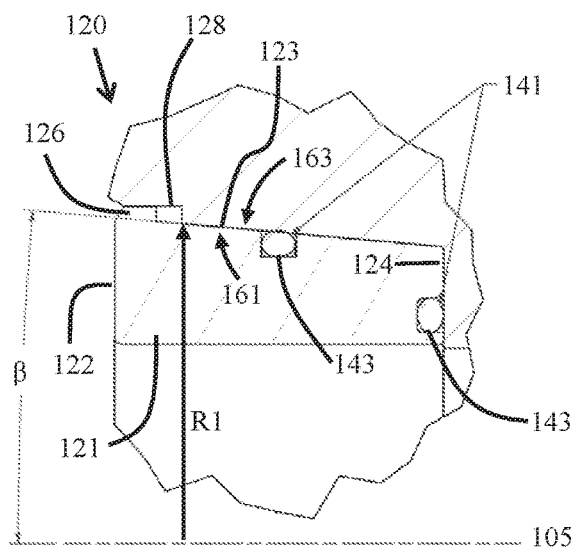
FIGS. 1B and 1C depict enlarged, fragmentary, cross-sectional views of example valve seats, according to one or more embodiments.
Figure 1C:
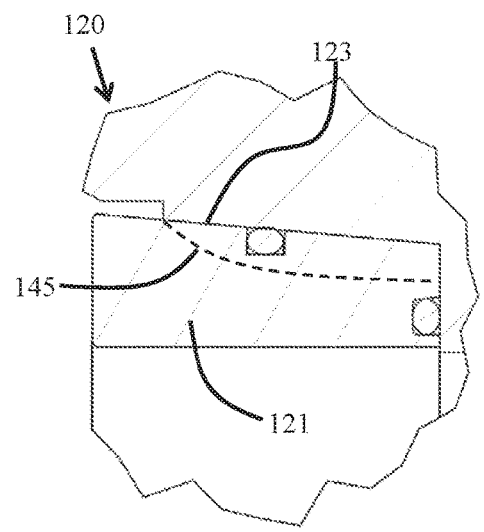

FIGS. 1B and 1C depict enlarged, fragmentary, cross-sectional views of the valve seat assembly 120 engaged with the downstream seat pocket 123 in accordance with one or more embodiments. Although, the discussion is for the downstream seat assembly 120 and the downstream seat pocket 123, the description is applicable to the upstream seat assembly 110 and upstream seat pocket 113 as well. The valve seat assembly 120 includes the downstream seat 121 and one or more seals 141. In particular, the seals 141 can include elastomer seals, O-ring seals, annular seals, any other suitable sealing device, or combinations thereof. Further, it will be appreciated that the valve seat assembly 120 can have any number of seals 141 arranged in a variety of locations on the downstream seat 121. Additionally, the downstream seat 121 can include one or more annular recesses 143 that receive the seals 141 to prevent fluid and/or debris from entering between the downstream seat 121 and the downstream seat pocket 123 and/or to prevent pressure loss in the passageway 103. Optionally, the valve seat assembly 120 can include the downstream seat 121 without the seals 141 and the recesses 143. The downstream seat 121 includes a gate end 122 facing the gate 131 and a body end 124 that is axially spaced from the gate end 122. As used herein, the gate end 122 refers to the distal end of the downstream seat 121 that faces and engages the gate 131, and the body end 124 refers to the distal end of the downstream seat 121 axially spaced from the gate end 122, with the body end 123 facing and engaging the body 101 in the downstream seat pocket 123. The downstream seat 121 can be configured to be received in the downstream seat pocket 123 and to seal against the gate 131.

The downstream seat 121 includes a width (e.g., outer diameter D1 of FIG. 1A or outer radius R1 of FIGS. 1A and 1B) that gradually narrows from the gate end 122 to the body end 124. As used herein, the width of the downstream seat 121 refers to an outer height, width, breadth, diameter (e.g., D1), radius (e.g., R1), or a like dimension with respect to the fluid flow axis 105 that defines an exterior lateral surface of the downstream seat 121. The downstream seat 121 may include a tapering cross-section 161 that defines the width (e.g., D1 or R1) of the downstream seat 121. For example, the tapering cross-section 161 can include a sloping surface that has a tapering angle β (e.g., β may be about 5°) relative to the fluid flow axis 105. In certain embodiments, the width (e.g., D1 or R1) of the downstream seat 121 can taper from the gate end 122 to the body end 124. The downstream seat 121 can include a conical surface that defines the lateral surface engaged with the downstream seat pocket 123. The tapering cross-section 161 can include more than one tapering angles β. For example, the tapering cross-section 161 can include a tapering slope of 10° that intersects with a tapering slope of 5° relative to the fluid flow axis 105.

The tapering cross-section 161 of the downstream seat 121 increases the surface area that actively engages the downstream seat pocket 123. Under pressure within the passageways 103 and 129, the downstream seat 121 applies a radial force perpendicular to the fluid flow axis 105 and a longitudinal force parallel to the fluid flow axis 105. These radial and longitudinal forces increase the pressure coupling between the downstream seat 121 and the downstream seat pocket 123. This creates a positive seal across the engaging faces of the downstream seat 121 and the downstream seat pocket 123, and in turn, prevents debris from entering between the downstream seat 121 and the downstream seat pocket 123. With less debris, the downstream seat 121 will be easier to remove from the gate body 101 for repair, cleaning, or replacement.

In other embodiments, the tapering cross-section 161 can include an arcuate surface 145, which can define the curve of an outer face of the downstream seat 121 including a concave surface or a convex surface. The outer face of the downstream seat 121 is the face that engages the downstream seat pocket 123. The downstream seat 121 can include a spherical or ellipsoidal surface that defines the surface engaged with the downstream seat pocket 123. As used herein, the width (e.g., D1 or R1) that gradually narrows from the gate end 122 to the body end 124 of the downstream seat 121 can include, but is not limited to, a width that tapers, a width that narrows along an arc, a width that narrows along an exponential curve, a width that narrows along a curve angled with respect to the fluid flow axis 105 from the gate end 122 to the body end 124, or combinations thereof. Additionally or alternatively the width (e.g., D1 or R1) that gradually narrows from the gate end 122 to the body end 124 of the downstream seat 121 can include a width configured to taper or narrow at an angle between approximately 1 degree and 89 degrees, 1 degree and 45 degrees, 1 degree and 30 degrees, 1 degree and 20 degrees, or 4 degrees and 6 degrees from the fluid flow axis 105, for example.

The downstream seat pocket 123 can be configured to receive the downstream seat 121 such that the tapering cross-section 163 of the downstream seat pock 123 mirrors or matches the tapering cross-section 161 of the downstream seat 121. For example, if the downstream seat 121 includes a tapering cross-section 161 that has a tapering angle (3, the downstream seat pocket 123 can include a tapering cross-section 163 that mirrors or matches the angle (3. In other embodiments, the downstream seat pocket 123 can include a spherical or ellipsoidal surface that mirrors or matches the tapering cross-section of the downstream seat 121 that has a spherical or ellipsoidal surface.

Referring to FIG. 1B, the downstream seat 121 can include a lip 126 that forms an external flange for being received in a recess 128 in the downstream seat pocket 123. Optionally, referring to FIG. 1C, the downstream seat 121 can exclude a lip or external flange. Still further, the downstream seat pocket 123 may not include the recess 128.

Likewise, the upstream seat 111 can include a width that gradually narrows from the gate end 112 to the body end 114 that takes the same form or shape as described herein concerning the width (e.g., D1 or R1) that gradually narrows for the downstream seat 121. In one or more embodiments, the upstream seat 111 can include the same or a different gradually narrowing width as the downstream seat 121.

Figures 2A, 2B:
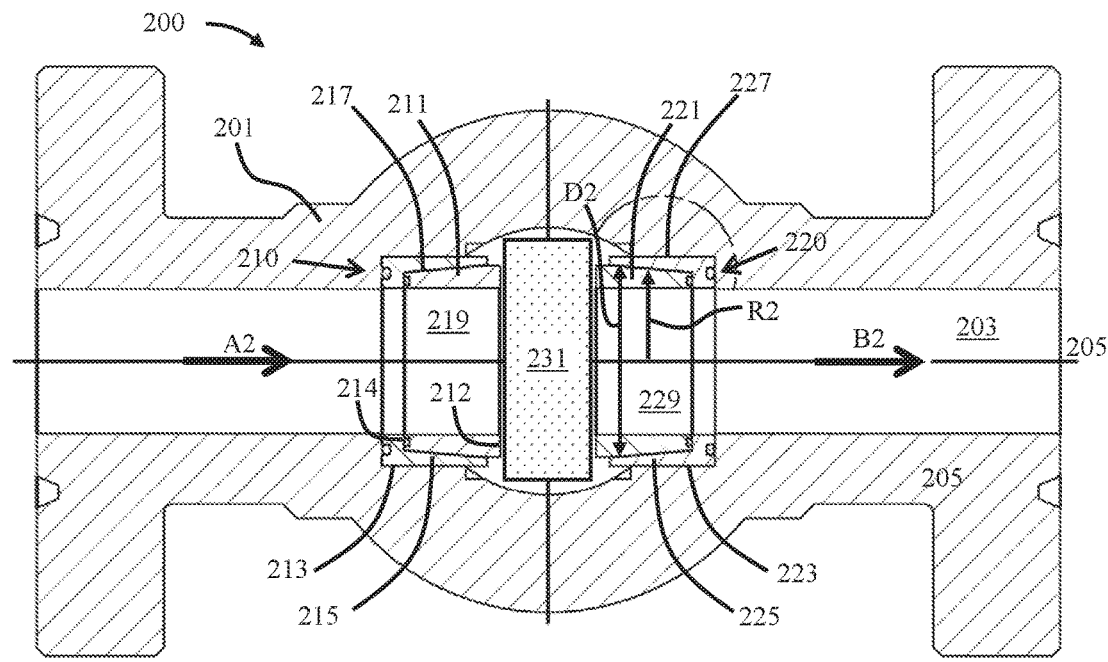
FIG. 2A depicts a cross-sectional view of an example gate valve, according to one or more embodiments.
FIG. 2B depicts an enlarged, fragmentary, cross-sectional view of an example valve seat and bushing, according to one or more embodiments.

FIG. 2A depicts a cross-sectional view of an example gate valve 200 in accordance with one or more embodiments. The gate valve 200 includes a valve body 201 having a passageway 203 for fluid flow that passes through a fluid flow axis 205. The arrows A2, B2 along the fluid flow axis 205 indicate the direction of fluid flow within the passageway 203. The gate valve 200 includes a gate 231 that can be moveably positioned to intersect the passageway 203 between the valve seat assemblies 210, 220. A gate actuator (not shown) coupled to the gate 231 can be used to move the gate 231 perpendicular to the plane parallel to the page (i.e., moving in or out of the page). The gate actuator can be configured to moveably position the gate 231 so that it the gate 231 intersects the passageway 203 preventing fluid flow through the passageway 203. The gate actuator can also moveably position the gate 231 so that the passageway 203 is open allowing fluid to flow through the gate 231 an the passageway 203.

The gate valve 200 includes valve seat assemblies 210, 220. The gate valve body 201 includes an upstream seat pocket 213 and a downstream seat pocket 223 that are configured to receive the valve seat assemblies 210, 220, respectively. The upstream valve seat assembly 210 includes an upstream bushing 215 and an upstream seat 211. The downstream valve seat assembly includes a downstream bushing 225 and a downstream seat 221. The upstream seat 211 and the downstream seat 221 can include annular passageways 219, 229 that can have the same diameter as the passageway 203 of the valve body 201.

FIG. 2B depicts an enlarged, fragmentary, cross-sectional view of the downstream valve seat assembly 220 engaged with the downstream seat pocket 223 in accordance with one or more embodiments. Although, the discussion is for the downstream valve seat assembly 220 and the downstream seat pocket 223, the description is applicable to the upstream valve seat assembly 210 and the upstream seat pocket 213 as well. The valve seat assembly 220 includes the downstream seat 221, the downstream bushing 225, and one or more seals 241. In particular, the seals 241 can include elastomer seals, O-ring seals, annular seals, any other suitable sealing device, or combinations thereof. Further, it will be appreciated that the valve seat assembly 220 can have any number of seals 241 arranged in a variety of locations on the downstream seat 221, the downstream bushing 225, or both.

The downstream bushing 225 includes one or more annular recesses 243 that receive the seals 241 to prevent fluid from flowing between the downstream bushing 225 and the downstream seat pocket 223 or to prevent pressure loss in the passageway 203. Optionally, the valve seat assembly 220 can include the downstream seat 221 and the downstream bushing 225 without the seals 241 and the recesses 243. The downstream seat 221 includes a gate end 222 facing the gate 231 and a body end 224 that is axially spaced from the gate end 222.

The downstream seat 221 includes a width (e.g., D2 or R2) that gradually narrows from the gate end 222 to the body end 224. As used herein, the width of the downstream seat 221 refers to an outer height, width, breadth, diameter (e.g., D2), radius (e.g., R2), or a like dimension with respect to the fluid flow axis 205 that defines an exterior lateral surface of the downstream seat 221. The upstream seat 211 and the downstream seat 221 can take the same form or shape as described herein as the downstream seat 121 of the gate valve 100. For example, the downstream seat 221 can include a lip or external flange that engages the downstream bushing 225. The downstream seat 221 may include a tapering cross-section 261 that defines the width (e.g., D2 or R2) of the downstream seat 221. In embodiments, the tapering cross-section 261 of the downstream seat 221 can have a conical surface that defines the lateral surface engaged with the downstream seat pocket 223. Also, the downstream seat 221 can include one or more recesses to receive one or more seals.

The gate valve 200 can be used and/or designed as described above with respect to one or more embodiment(s) as depicted in FIGS. 1A-C. The downstream seat 221 can have a width (e.g., D2 or R2) that gradually narrows from the gate end 222 to the body end 224. The width (e.g., D2 or R2) that gradually narrows from the gate end 222 to the body end 224 of the downstream seat 221 can include, but is not limited to, a width that tapers, a width that narrows along an arc, a width that narrows along an exponential curve, a width that narrows along a curve angled with respect to the fluid flow axis 205 from the gate end 222 to the body end 224, or combinations thereof. Additionally or alternatively, the width (e.g., D2 or R2) that gradually narrows from the gate end 222 to the body end 224 of the downstream seat 221 can include a width configured to taper or narrow at an angle between approximately 1 degree and 89 degrees, 1 degree and 45 degrees, 1 degree and 30 degrees, 1 degree and 20 degrees, or 4 degrees and 6 degrees from the fluid flow axis 205, for example.

Optionally, the downstream bushing 225 is located between the downstream seat 221 and the downstream seat pocket 223. The downstream seat 221 is indirectly coupled to the downstream seat pocket 223 via the downstream bushing 225. The downstream bushing 225 includes an inner face 226 that mates with the tapering cross-section 261 of the downstream seat 221. The downstream bushing 225 also includes an outer face 227 that mates with the downstream seat pocket 223. The downstream seat pocket 223 can be defined by a cylindrical surface within the valve body 201. The downstream bushing 225 can include outer face 227 having a rectangular cross-section and an internal flange 228 that mates with the downstream seat 221 and the downstream seat pocket 223. Thus, the downstream bushing 225 can be configured to receive the downstream seat 221 and to be received in the downstream seat pocket 223. The upstream bushing 215 includes an outer face 217 and can take the same form or shape as described herein as the downstream bushing 225.

The gate valve 200 benefits from including the downstream bushing 225 by allowing the downstream seat pocket 223 to be machined from the gate body 201 as a cylinder. This cylindrical shape of the downstream seat pocket 223 can be easier to machine from the gate body 201 than an interior surface that matches or mates with the tapering-cross section 261 of the downstream seat 221. The downstream bushing 225 adapts the cylindrical downstream seat pocket 223 to the tapering cross-section 261 of the downstream seat 221. Thus, the gate valve 200 can benefit from the tapering cross-section 261 of the downstream seat 221 as described herein (e.g., radial and longitudinal forces that create a positive seal), while including the cylindrical downstream seat pocket 223 that is easier to machine from the gate body 201. Further, the downstream bushing 225 can be used to retrofit cylindrical seat pockets to receive the downstream seat 221. In other embodiments, the downstream bushing 225 can be used to adapt downstream seat 221 to couple with any suitable shape or size of the downstream seat pocket 223.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. When introducing elements of various embodiments of the present disclosure, the articles "a," "an," and "the" are intended to mean that there are one or more of the elements. The terms "comprising," "including," and "having" are used in an open-ended fashion, and thus should be interpreted to mean "including, but not limited to . . . ." Any use of any form of the terms "connect," "engage," "couple," "attach," "mate," "mount," or any other term describing an interaction between elements is intended to mean either an indirect or a direct interaction between the elements described. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. The use of "top," "bottom," "above," "below," "upper," "lower," "up," "down," "vertical," "horizontal," "first," "second," "inner," "outer," and variations of these terms or like terms is made for convenience but does not require or imply any particular orientation, number, or relative prominence of these components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A gate valve, comprising:
    a valve body comprising:
        a passageway for fluid flow; and
        a seat pocket;
    a gate configured to moveably intersect the passageway; and
    a single-piece seat configured to be removably received in the seat pocket and comprising a gate end facing the gate and a body end, wherein the width of the seat gradually tapers from the gate end to the body end to define an exterior lateral surface and wherein the seat is configured to seal against the gate along the gate end and also form a seal along the exterior lateral surface and the body end.

2. The gate valve of claim 1, further comprising an additional seat configured to be received in an additional seat pocket and comprising a gate end facing the gate and a body end, wherein the width of the additional seat gradually tapers from the gate end to the body end to define an exterior lateral surface and wherein the additional seat is configured to seal against the gate along the gate end and also form a seal along the exterior lateral surface and the body end.

3. The gate valve of claim 1, wherein the seat comprises an outer face including a conical surface.

4. The gate valve of claim 1, wherein the seat comprises an outer face including a concave surface or a convex surface.

5. That gate valve of claim 1, wherein:
    the seat pocket comprises a recess; and
    the seat comprises a lip configured to engage the recess.

6. The gate valve of claim 1, wherein the seat comprises an additional passageway for fluid flow.

7. The gate valve of claim 1, wherein the seat comprises an annular recess configured to receive a seal.

8. The gate valve of claim 1, further comprising a bushing located between the seat pocket and the seat, wherein the seat is indirectly coupled to the seat pocket via the bushing.

9. The gate valve of claim 1, further comprising a bushing comprising an internal flange and located between the seat pocket and the seat.

10. A gate valve seat assembly for use in a gate valve comprising a moveable gate and a seat pocket, the valve seat assembly comprising a single-piece seat configured to be removably received in the seat pocket and comprising a gate end facing the gate and a body end, wherein the width of the seat gradually tapers from the gate end to the body end to define an exterior lateral surface and wherein the seat is configured to seal against the gate along the gate end and also form a seal along the exterior lateral surface and the body end, wherein the body end is an axially facing surface of the seat.

11. The gate valve seat assembly of claim 10, wherein the seat comprises an outer face including a conical surface.

12. The gate valve seat assembly of claim 10, wherein the seat comprises an outer face including a concave surface or a convex surface.

13. The gate valve seat assembly of claim 10, wherein:
    the seat pocket comprises a recess; and
    the seat comprises a lip configured to engage the recess when the seat is received within the seat pocket.

14. The gate valve seat assembly of claim 10, wherein the seat comprises an annular recess configured to receive a seal.

15. The gate valve seat assembly of claim 10, further comprising a bushing configured to receive the seat.

16. The gate valve seat assembly of claim 10, further comprising a bushing comprising an internal flange and configured to receive the seat.

17. The gate valve seat assembly of claim 10, wherein the seat comprises a passageway for fluid flow.

18. The gate valve seat assembly of claim 10, wherein the width of the seat gradually tapers at an angle from about 4 degrees to about 6 degrees.

* * * * *